March 2, 1943. E. MERKI 2,312,766
PRUNING HOOK
Filed June 14, 1941
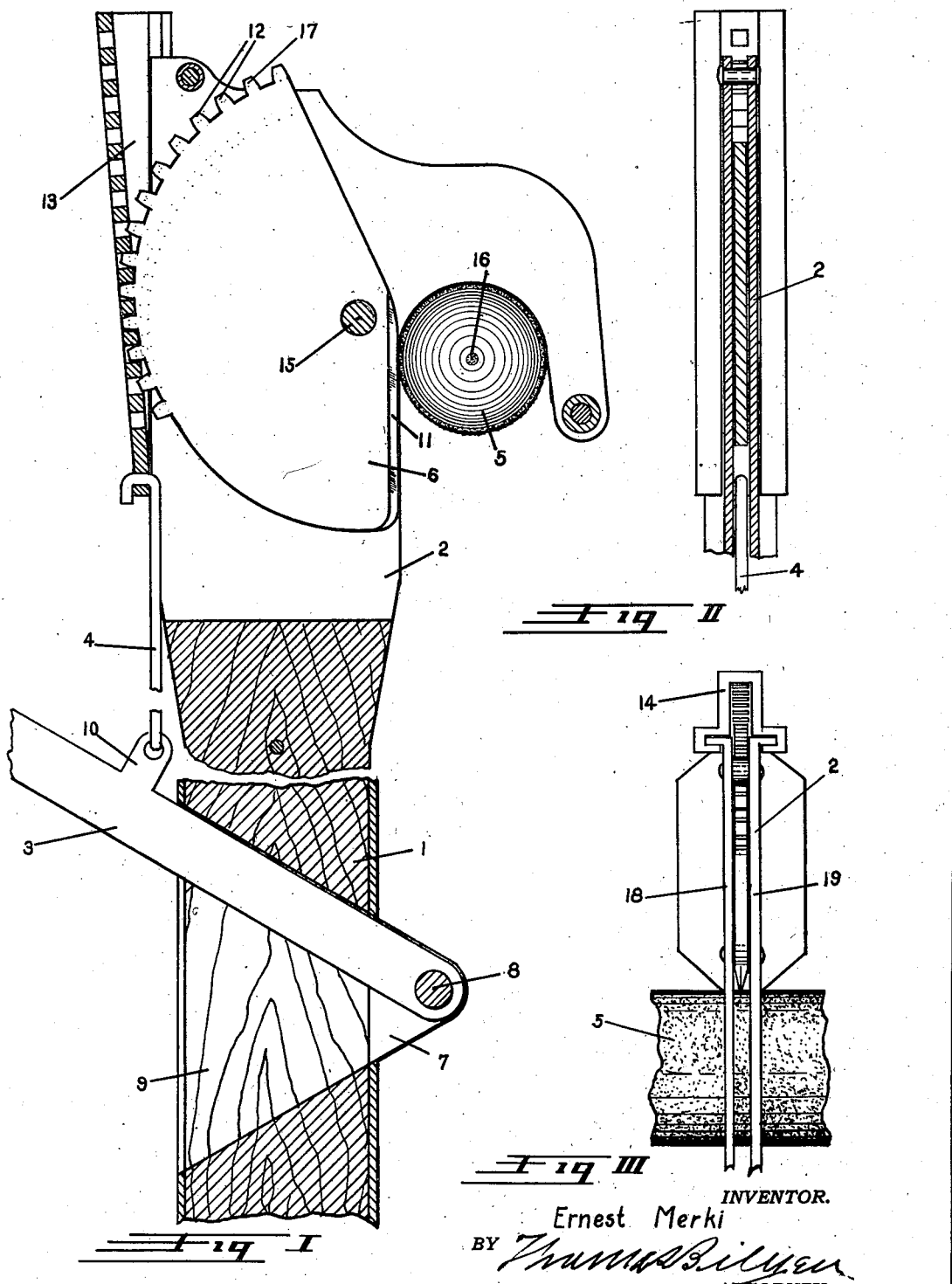
INVENTOR.
Ernest Merki
BY [signature]
ATTORNEY.

Patented Mar. 2, 1943

2,312,766

UNITED STATES PATENT OFFICE 2,312,766

PRUNING HOOK

Ernest Merki, Portland, Oreg.

Application June 14, 1941, Serial No. 398,164

2 Claims. (Cl. 30—250)

This invention relates to pruning hooks for use of gardeners, orchardists, foresters, and the like.

The invention is comprised primarily of a head having a handle secured thereto. The head has a hook outwardly extending from one side to facilitate the attachment of this device to the limb to be cut.

A cutting blade is mounted within the head with the cutting blade having a gear segment formed upon its outer periphery. A rack coacts with the segment to rock the cutting blade.

A lever is mounted within the handle member and a pull rod connects the rack with the lever.

The primary purpose and object of my invention is to provide a pruning hook that may be easily engaged with the limb that is to be cut and one in which the mechanical advantage will increase as the cutting blade approaches the heaviest cut to be made upon the limb that is to be cut.

A further object of the invention consists in providing a pruning hook that is made of few parts and one that may be maintained in a satisfactory cutting condition over a long period of usefulness.

A still further object of my invention is to so construct the device that a minimum of weight will be employed within the cutting head.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. I is a fragmentary partially sectional side view of the device.

Fig. II is a sectional front view of the head of the assembled device.

Fig. III is a fragmentary top plan view of the head portion of the assembled device.

Like reference characters refer to like parts throughout the several views.

My pruning hook is comprised of a handle 1. The handle 1 has a head 2 secured to its upper end. An operating lever 3 is hingedly secured to the handle.

Heretofore, in devices of this kind, the pull rod 4 connecting the lever 3 with the actuator of the cutting blade has been hinged within the handle member. This necessitates the pull rod being moved out of parallel relationship with the longitudinal center line of the handle to thereby place undue strains within the structure as the maximum cutting effort is approached in the cutting of the object 5 with the cutting blade 6.

I provide a lever support 7 and place the same within the handle 1 and provide a pivotal shaft 8 at the opposite side of the handle to which the pull rod 4 is placed. I cut out the handle structure at the location of the lever as illustrated at 9 to facilitate the locating of the lever 3 in the cutout portion and to facilitate the manipulation of the lever 3. This aids in the movement of the pull rod 4 more nearly paralleling to that of the longitudinal center line of the handle.

An attaching bracket 10 is secured to the lever 3 to which the pull rod 4 is attached.

The cutting blade 6 is suitably sharpened on its cutting edge as illustrated at 11. A gear segment of suitable toothed members 12 is disposed upon the outer periphery of the cutting blade 6.

A rack 13 is provided. The rack 13 moves within a suitable guide 14. It will be noted that the longitudinal line of the rack 13 is not parallel to the longitudinal center line of the head and of the handle to thereby permit mechanical advantage being derived from the cutting blade as the lever 13 is moved in the cutting position to thereby provide a distinct mechanical advantage as the cutting blade moves into cutting position requiring maximum cutting effort. The gear segment disposed upon the cutting member 6 has the teeth 12 increasingly spaced from the shaft 15 to increase the mechanical advantage of the cutting effort as the blade 6 is partially rotated about the shaft 15.

It will further be noted that as the rack moves in its line of travel to rotate the cutting blade that the position of the teeth along a part of the periphery of the cutting blade move away from the center line of the shaft 15 about which the cutting blade rotates. This is made possible through the fact that the teeth disposed in the rack are not parallel to the base of the member 13 in which the rack teeth are disposed.

It will also be noted that the position of the shaft 15 is considerably out of line with the center 16 which is the center of the maximum limb 5 that is to be cut so that the mechanical advantage is also determined by the location of the shaft 15 and the fact that the rack moves out of parallel relationship with the longitudinal center line of the head so that greatest mechanical advantage is obtained when the cutting blade has been rotated until the tooth 17 engages the rack at which time the limb to be cut has been entirely severed.

The blade 6 moves between two parallel plates 18 and 19. The hand operated lever 3 is of the conventional type, but a part of the length of the lever 3 is shown. The length of the lever 3 is determined by the service to which the pruning hook is to be used. For shrubs the lever 3 will be of less length than where heavier work is to be performed by the pruning hook.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow:

What I claim is:

1. A pruning hook comprising, a shaft, a head secured to the end of the shaft formed with a hook adapted to engage a limb, a spiral segment pivotally mounted upon the head to provide for the passage of the segment across the aperture of the hook and formed in detail with a cutting edge and peripheral cogs, a rack slidably mounted in the head and formed with teeth aligned with reference to a tangent to the spiral segment, the same being inclined to the direction in which the rack is slidable, and handle and link means serving to transmit force applied to the handle for actuating the rack and segment.

2. A pruning hook comprising, a shaft, a head formed with a hook secured to one end of the shaft, a spiral segment pivotally mounted upon the head to traverse the aperture of the hook and formed in detail with peripheral cogs and a cutting edge, a rack formed with teeth engaging the segment cogs slidable in the head in a direction inclined to the pitch-line of the rack teeth, a lever pivotally mounted at the other end of the shaft, and link means connecting the lever to the rack.

ERNEST MERKI.